（12）United States Patent
Olson et al.

US008173566B2

(10) Patent No.: US 8,173,566 B2
(45) Date of Patent: May 8, 2012

(54) PROCESS FOR REGENERATING A SPENT SORBENT

(75) Inventors: Edwin S. Olson, Grand Forks, ND (US); Michael J. Holmes, Thompson, ND (US); John H. Pavlish, East Grand Forks, MN (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 916 days.

(21) Appl. No.: 10/554,018

(22) PCT Filed: Apr. 23, 2004

(86) PCT No.: PCT/US2004/012828
§ 371 (c)(1),
(2), (4) Date: Jan. 23, 2007

(87) PCT Pub. No.: WO2004/094024
PCT Pub. Date: Nov. 4, 2004

(65) Prior Publication Data
US 2007/0167309 A1 Jul. 19, 2007

Related U.S. Application Data

(60) Provisional application No. 60/464,868, filed on Apr. 23, 2003.

(51) Int. Cl.
*B01J 38/64* (2006.01)
(52) U.S. Cl. .................................. 502/25; 502/22
(58) Field of Classification Search ............ 502/22, 502/25, 27, 28, 29, 32, 220
See application file for complete search history.

(56) References Cited

U.S. PATENT DOCUMENTS

| | | |
|---|---|---|
| 1,984,164 A | 12/1934 | Stock |
| 3,194,629 A | 7/1965 | Dreibelbis et al. |
| 3,662,523 A | 5/1972 | Revoir et al. |
| 3,849,267 A | 11/1974 | Hilgen et al. |
| 4,101,631 A | 7/1978 | Ambrosini et al. |
| 4,196,173 A | 4/1980 | deJong et al. |
| 4,708,853 A | 11/1987 | Matviya et al. |
| 4,786,483 A | 11/1988 | Audeh |
| 4,889,698 A | 12/1989 | Moller et al. |
| 4,956,162 A | 9/1990 | Smith et al. |
| 5,480,619 A | 1/1996 | Johnson et al. |
| 5,505,766 A | 4/1996 | Chang |
| 5,607,496 A | 3/1997 | Brooks |
| 5,672,323 A | 9/1997 | Bhat et al. |
| 5,827,352 A | 10/1998 | Altman et al. |
| 6,013,593 A | 1/2000 | Lee et al. |
| 6,027,551 A | 2/2000 | Hwang et al. |
| 6,136,072 A | 10/2000 | Sjostrom et al. |
| 6,214,304 B1 | 4/2001 | Rosenthal et al. |
| 6,258,334 B1 | 7/2001 | Gadkaree et al. |
| 6,342,462 B1 * | 1/2002 | Kulprathipanja ............... 502/25 |
| 6,383,981 B1 | 5/2002 | Blankenship et al. |
| 6,475,451 B1 | 11/2002 | Leppin et al. |
| 6,576,585 B2 | 6/2003 | Fischer et al. |
| 6,579,507 B2 | 6/2003 | Pahlman et al. |
| 6,596,661 B2 | 7/2003 | Neufert |
| 6,610,263 B2 | 8/2003 | Pahlman et al. |
| 7,247,279 B2 | 7/2007 | Pahlman et al. |
| 7,514,052 B2 | 4/2009 | Lissianski |
| 2002/0150516 A1 | 10/2002 | Pahlman et al. |
| 2004/0003716 A1 | 1/2004 | Nelson, Jr. |

FOREIGN PATENT DOCUMENTS

| | | |
|---|---|---|
| CA | 2327602 | 6/2001 |
| CA | 2456272 | 2/2002 |
| CN | 1048173 A | 1/1991 |
| DE | 3426059 | 4/1986 |
| DE | 3816600 | 11/1989 |
| WO | WO02/28513 | 4/2002 |
| WO | WO03072241 | 9/2003 |

OTHER PUBLICATIONS

Ghorishi,B.; Gullet, B.K., "Sorption of mercury species by activated carbons and calcium-based sorbents", Waste Manage Res. 1993, 16, 582-593.
Lancia, A.; Musmarra, D.; Pepe, F.; Volpicelli, "Adsorption of Mercuric Chloride Vapours from Incinerator Flue Gases on Calcium Hydroxide Particles", G. Combust. Sci. & Technol. 1993, 93, 277-289.
Streng, S.; Kassebohm, "Toxics control by activated charcoal within the System Dusseldorf full scale experience", B. Fuel Proc. Technol. 1994, 39, 431-444.
Tsuji, K; Shiraishi, I.; Dague, R.F., "The Activated Coke Process for Combined SOx/NOx/Air Toxics Reduction", Proceedings, Sixth International Symposium, Air & Water Management Assoc., New Orleans, LA, Mar. 10-12, 1993.
Olson, David G., Tsuji, K., Shiraishi, I., "The reduction of gas phase air toxics from combustion and incineration sources using the MET-Mitsui-BF activated coke process", Fuel Proc. technol. 65-66, 2000, 393-405.

* cited by examiner

*Primary Examiner* — Edward Johnson
(74) *Attorney, Agent, or Firm* — Schwegman, Lundberg & Woessner, P.A.

(57) ABSTRACT

A method and apparatus is provided for regenerating a sorbent that has been poisoned by components derived from flue gas. The sorbent is treated with an agent to remove the poisoning components and introduce a promoting agent into the sorbent. The method and apparatus can also be used to enhance the effectiveness of a new sorbent.

32 Claims, 3 Drawing Sheets

PROCESS FOR REGENERATING A SPENT SORBENT

CROSS REFERENCE TO RELATED APPLICATIONS

This application is a US national stage application of co-pending commonly owned PCT application number PCT/US04/12828, filed on Apr. 23, 2004, entitled "PROCESS FOR REGENERATING A SPENT SORBENT," which claims priority to U.S. provisional patent application No. 60/464,868, filed on Apr. 23, 2003, entitled "PROCESS FOR REGENERATING A SPENT SORBENT," both of which are incorporated by reference herein.

FIELD OF THE INVENTION

This invention relates to the removal of mercury and other pollutant species from flue gas streams generated during the burning of fossil fuels. In particular, this invention is drawn to a process and system for regenerating spent sorbents, or enhancing fresh sorbents.

BACKGROUND OF THE INVENTION

Burning fossil fuels such as coal generates a flue gas that contains contaminants including mercury and other trace elements. In addition, the flue gas contains oxides of sulfur and nitrogen (acid gas emissions) and particulates whose release to the environment must be controlled by use of sorbents, scrubbers, filters, precipitators, and other removal technologies. In the example of mercury, mercury is generated in its' elemental form during combustion. Downstream of the boiler, in the ducts and stack of the combustion system, part of the elemental mercury is oxidized. The amount of mercury oxidized depends on the amount of hydrochloric acid (HCl) and other gases present in the flue gas. The amount of mercury in a gas stream varies with different coal, but a typical concentration of mercury in the stream of combustion gas is about 5 parts per billion (ppb). As a result, several pounds of mercury per day may be emitted in some utilities.

Several types of mercury control methods for flue gas have been investigated, including injection of fine sorbent particles into a flue gas duct and passing the flue gas through a sorbent bed. In these types of mercury control methods, the mercury contacts the sorbent and attaches to its surface, where it can be collected along with the fly ash in a baghouse or electrostatic precipitator (ESP). One disadvantage in these prior art systems is that sorbents are used only once and discarded. The sorbents are are not regenerated and reused. These prior art techniques also create solid waste disposal problems, and the spent sorbent may contaminate the collected ash for use in various applications.

Another type of mercury control method uses carbon beds for mercury capture in flue gas. In these types of systems, spent sorbent is typically burned and not regenerated. Some prior art systems employ a recirculating carbon bed, where mercury is removed along with acid gases (as ammonium salts) and the carbon is regenerated at high temperatures where ammonium sulfate is decomposed to $SO_2$ and $N_2$, and mercury desorbs from the sorbent. Attrition of the sorbent results in a significant sorbent cost in this type of control method.

Another type of mercury control method involves injecting manganese oxide sorbent particles in a flue gas stream. For example, U.S. Pat. No. 6,579,507 describes such a method. In this patent, regeneration is claimed by removal of spent oxide particles from the reaction zone and rinsing with dilute aqueous acid. One problem with manganese oxide sorbents is that, while they do oxidize and remove elemental mercury from flue gas, the reaction rates are far slower than those with activated carbons. This means that the $MnO_2$ sorbent can not handle high flow rates of flue gas compared with the injected carbon sorbents. Also, the acid wash of the $MnO_2$ sorbent does not restore the sorbent to its full original activity. In the described $MnO_2$ sorbent system, the purpose of the acid wash treatment is to actually remove the poisoned and spent manganese from the surface of the sorbent as soluble salts, which destroys a portion of the sorbent. The soluble salts contaminate the wash solution, and it is difficult to economically separate and recover the manganese and mercury.

Of interest in designing a mercury control process is to use the sorbent downstream of a particulate control device so the sorbent is not highly diluted with the ash particles. The sorbent could then be more easily regenerated and recycled. The prior art discusses several examples of this type of configuration and sorbent processing.

U.S. Pat. No. 5,607,496 teaches the oxidation of mercury on a metal oxide sorbent bed and subsequent absorption to a sorbent. The sorbent bed follows the particulate removal equipment and thus the gas still contains the $SO_X$ and $NO_X$, which react with the metal oxide sorbent to form metal sulfates, that poison the bed. High temperatures are proposed to regenerate the bed. However, mercury is only partially removed from the sorbent at temperatures up to 500 degrees C. Also, the sorbents do not work effectively after regeneration. The cause may be that manganese sulfate formed during the sorption cycle does not completely decompose back to an active manganese oxide form. U.S. Pat. No. 6,383,981 describes a fixed $MnO_2$ or $Fe_2O_3$ bed for removal of mercury from a hydrocarbon stream, but no regeneration method is included.

U.S. Pat. No. 6,596,661 describes the regeneration of a plate or honeycomb material composed of transition metal oxides that was used for sorption of mercury in flue gas. The claimed process involves heating the sorbent in a reducing gas stream to remove poisons, followed by impregnation with a poly functional complex-forming reagent containing the catalyst active component to restore mercury capture capacity. The first of these steps can remove the mercury, but it is unclear whether it actually removes the sulfate poison. The second of these steps is rather expensive, because one is actually reconstituting the reagent on the sorbent.

Other types of mercury control methods using porous beds containing a mercury oxidizing reagent on a solid support for removal of mercury from gas streams are described in several patents. For example, U.S. Pat. No. 1,984,164 describes the use of activated carbon or other solid impregnated with a halogen for removing mercury from air. The impregnation method is not specified. No regeneration is claimed. Examples include peroxomonosulfate (for example, U.S. Pat. No. 4,786,483), triiodide or other mixed halogens (for example, U.S. Pat. Nos. 3,194,629 and 3,662,523), and sulfur (for example, U.S. Pat. Nos. 3,194,629; 4,101,631, 4,708, 853, and 6,258,334). In these examples, the reagent material is destroyed either by reaction with the flue gas during sorption or by attempts to regenerate the sorbent. Therefore, these sorbents are not regenerated, except by reimpregnation of the expensive reagent. Amalgamating noble metals (gold, silver) on a suitable support can be regenerated by microwave heating (for example, U.S. Pat. No. 6,136,072), but are expensive and not especially active for sorption in flue gas.

SUMMARY OF THE INVENTION

An apparatus and method is provided for regenerating used sorbents by exposing used sorbents to a solution to remove contaminants collected on the sorbent. An apparatus and method is also provided for enhancing the effectiveness of a sorbent by exposing the sorbent to a solution that increases the sorbent effectiveness. In one example, the solution used is an aqueous acidic solution.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
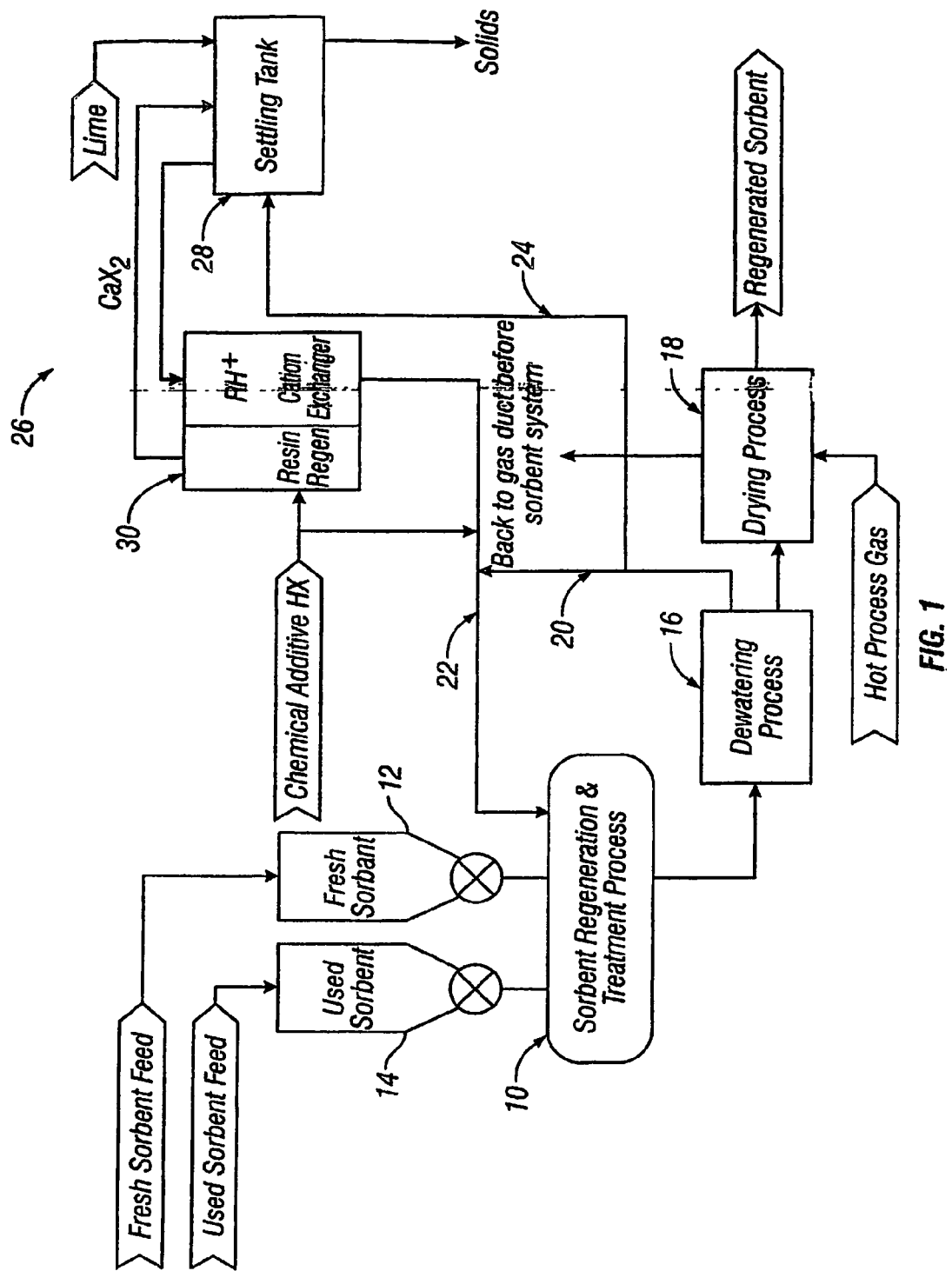
FIG. 1 is a block diagram illustrating one example of the application of the sorbent regeneration technology of the present invention.

The present invention relates to the process for the removal of mercury and other pollutant species from flue gas streams generated during the burning of fossil fuels, such as in a coal-fired utility. This removal process utilizes a sorbent to remove pollutants from the flue gas stream, which is at the same time interacting with other flue gas components that result in poisoning or deactivating the sorbent and reducing its capacity or reaction rates with the pollutant species. The present invention provides a cost effective way to capture the pollutants by utilizing a process to regenerate the reactivity and capacity of the sorbent.

Generally, a process of the present invention includes washing a used sorbent with agents selected to remove the anions that collect on the sorbent during exposure to flue gas and which poison the binding sites for mercury or other contaminants. The process also impregnates the sorbent with agents that promote the chemisorption of mercury and other contaminants in the next service cycle of the sorbent. This is achieved by the fact that, following or during the removal of the sulfate or other contaminants, the sorbent is washed with a reagent that restores mercury or other contaminant sorption effectiveness of the sorbent.

In some examples, the invention applies to regeneration of a sorbent in a powdered form that has been injected into a flue gas stream after particulates have been removed, and have been collected on a filtration device or ESP device. Examples of the composition of sorbents include activated carbon, a metal oxide or metal oxides, a precious metal, or a composite of any of these. In one example using activated carbon, the sorbent may take the form of powdered, granulated, or fibrous carbon. Other examples are also possible. In other examples, sorbent is used with a sorbent bed, rather than being injected. A sorbent bed may be a fixed bed, traveling bed, or a travelling fiber filter. In either type, the poisoning contaminants from the flue gas are removed and a promoting agent added to restore mercury sorption activity. This process of promoting the activity of the carbon itself contrasts with the earlier more expensive art of adding a reagent (such as peroxide, gold, triiodide, etc.) to the sorbent.

To help understand the present invention, it helps to understand how a sorbent loses its ability to absorb contaminants. Reactions between acidic components generated from flue gas poison the basic binding sites on the sorbent for oxidized mercury, which is a Lewis acid. Binding of other metal ions, such as boron, tin, arsenic, gallium, Sb, Pb, Bi, Cd, Ag, Cu, Zn, or other contaminants that may also be Lewis acids, would suffer from loss of the intrinsic carbon basic sites.

To achieve the regeneration effect, it is necessary to remove the contaminant species that occupy the basic binding sites on the sorbent. Typically, there are several acid species that occupy these sites far exceeding the number of bound mercury ions. The most serious competitor for the binding sites is sulfuric acid, formed from the $SO_2$ and $SO_3$ in the flue gas. The sulfate formed by reaction of the sulfuric acid with the basic sorbent site can be removed from the sorbent by washing with aqueous hydrochloric acid (HCl) or excess of chloride ion to exchange the sulfate or hydrogen sulfate ions. Washing with an acid or salt solution is more effective than washing with water since the anions exchange the sulfate bound to the sorbent sites. Other acids or reagents will also exchange these ions. Washing with hydrochloric acid and/or other acids also has the effect of promoting the subsequent oxidation of elementary mercury when the sorbent is returned to service. Adding the proton from the acid to a basic carbene site on the carbon edge structure forms a carbocation that accept electrons from the neutral mercury atom forming the oxidized mercury species that is bound to the sorbent surface.

There are several solutions that can be used with the present invention to regenerate and/or enhance a sorbent. In a first example, the solution includes one or more inorganic acids such as hydrochloric acid (HCl), hydrobromic acid (HBr), and hydroiodic acid (HI). In another example, the solution includes one or more salt solutions. The salt solution may include a halide salt, containing an associated cation, such as ammonium, sodium, potassium, iron, aluminum, boron, zinc, manganese, magnesium, calcium. In another example, the solution includes an organic acid, such as citric acid, tartaric acid, oxalic acid, malonic acid, maleic acid, formic acid, and acetic acid. In another example, the solution includes an organic salt solution. An organic salt solution may include at least one anion from at least one of citric acid, tartaric acid, oxalic acid, malonic acid, maleic acid, formic acid, and acetic acid, and at least one associated cation, such as ammonium, sodium, potassium, iron, aluminum, boron, zinc, manganese, magnesium, or calcium.

In another example, the solution includes a compound comprised of a halogen combined with a Group V or Group VI element such as phosphorus, oxygen, sulfur, selenium, nitrogen, etc. In one example, the compound includes one or more of thionyl chloride, sulfuryl chloride, phosphorus trichloride, phosphorus oxychloride, hypochlorous acid, and chlorine. In another example, the compound includes one or more of thionyl bromide, sulfuryl bromide, phosphorus tribromide, phosphorus oxybromide, hypobromous acid, and bromine.

In another example, water can be used to wash much of the sulfuric acid and sulfates off a carbon sorbent. However this treatment may only be effective in restoring the activity of the sorbent for capture of elementary mercury if halogens are already incorporated into the carbon during a pretreatment or during a previous regeneration cycling of the carbon, which was carried out with a hydrohalide acid (HX).

The present invention may also include washing the recovered powdered sorbent or the bed material in a solution of the contaminant removal agent, for example, an acid reagent. Washing with the reagents will exchange the flue-gas derived sulfate ions and other contaminants from the binding sites on the sorbent the invention may also include the impregnation of agents into the sorbent to promote sorption activity. This may be accomplished using promoters such as a protonic hydro halide acid HX or Lewis acid $MeX_n$. These reagents enhance metal oxidation activity by creating cationic character on the carbon edge structure that attracts mercury atoms and extracts electrons from said mercury atom. A similar mechanism applies to oxidation and capture of reduced arsenic and other pollutant species. In another example, the invention may use a reagent that promotes oxidation via chlorination of a sorbent surface, such as $SOCl_2$, $SO_2Cl_2$, $PCl_3$, $POCl_3$, $HOCl$, $NaOCl$, $Cl_2$, and corresponding bromine (or other halide) reagents. These reagents can be liquid, vapor or solution reagents, depending on their stability.

The slurry of treated sorbent particles is subjected to a dewatering step (for example, centrifugal-based, gravity-based, or filtration-based methods) to remove the sorbent particles from the aqueous acid. Finally, the sorbent is further dried via a mild thermal treatment before returning to service. There are several reasons for dewatering the sorbent. By improving flow characteristics, this step will make the powdered or moving particle sorbent easier to handle during duct injection or in a contactor unit. Moisture may also block the pores preventing gas phase diffusion of elemental mercury, or may promote the sorption and subsequent oxidation of $SO_2$ to sulfuric acid.

In another example, the water produced in the dewatering step may be treated in a settling basin with a Ca or Mg salt to produce insoluble Ca or Mg SO4, or other insoluble salt of the contaminant, which is removed as a sludge or solid. Examples of suitable Ca or Mg salts include lime, halide, or solutions spent from the resin regeneration step. The treated water may also be further subjected to treatment with a cation exchange resin in the proton form to remove any excess of Ca or Mg in the water from the settling basin and replace it with hydrogen ions. The resulting solution is then fundamentally what is required of the carbon regeneration step (exchange out the contaminant and add the promoter acid). In this process, the spent cation exchange resin from the process is treated with a protonic acid, such as HCl, to regenerate the resin in the proton form and produce a soluble Ca or Mg salt. This process may include the addition of the Ca and Mg brine from the resin regenerating unit to the settling tank to aid the precipitation of the insoluble Ca or Mg salt of the contaminant. The process may also include the addition of acid or salt to the recycled water from the resin treatment step as needed to increase concentrations to those required for contaminant removal and promotion of sorbent activity.

In another example, the waste water solution from the dewatering step can be simply disposed of by adding to scrubber slurry, if available, or using other disposal methods. This will convert the contaminant to insoluble calcium salts as scrubbers are designed to do.

In one example of the present invention, a regenerated or enhanced sorbent can be improved by use of an additive mixed with the sorbent prior to injecting the regenerated sorbent into a flue gas stream. In one example, the additive can be a calcium-based additive which functions to neutralize acids.

Although the process for regenerating a deactivated sorbent is suitable for various forms of sorbent, a descriptive example of a regeneration process according to the invention (including test results) follows. In this example, an activated carbon sorbent was used. The regeneration of several carbon sorbents was tested, including the powdered Norit FGD sorbent, an aerogel carbon film sorbent, and a carbon filter consisting of fine carbon particles imbedded on a polymer fiber matrix.

The carbon sorbents were initially tested in a heated bed where a synthetic flue gas stream containing elemental mercury (11 $\mu g/m^3$) was passed through the bed. Concentrations of total and elemental mercury in the effluent gas were determined using a PSI Sir Galahad mercury continuous emission monitor (CEM). The powdered sorbent was supported on a quartz filter during the test, and the other sorbents were tested as a triple layer. A comparison of the original FGD powdered carbon sorbent with the sorbent after regeneration by washing with 0.1 N HBr, collecting the powder by centrifugation, and drying, revealed that the mercury capture activity was increased from an initial capture efficiency of about 50% of the mercury in the inlet to 100% capture. A comparison of the sorbent after it is regenerated again with HBr after its second service cycle revealed that the mercury capture is again 100% at the start of the test, and stays at higher capture efficiency for a substantially longer period of time. Similar results were obtained with the carbon film and carbon fiber sorbents by regeneration with 0.1 N HCl.

FIG. 1 is a block diagram illustrating one example of the application of the sorbent regeneration technology of the present invention. FIG. 1 should not be considered limiting, but rather depicts an exemplary system for incorporating the technology.

The process illustrated in FIG. 1 is laid out around the sorbent regeneration and treatment process 10 that, as a minimum, contacts the sorbent materials with the aqueous chemical reagent. This step could also include stronger agitation or grinding balls to expose fresh surfaces. Fresh sorbent and used sorbent are fed from separate storage silos 12 and 14 and metered at rates dependent upon mercury control feedback from the treated flue-gas. A contact reactor receives a mixture of fresh and used sorbent and facilitates the sorbent regeneration and treatment process 10. In one example, the mixture includes about 80 percent used sorbent and 20 percent fresh sorbent. Of course, other ratios can also be used. In one example, used sorbent is regenerated without using fresh sorbent. In the contact reactor, the sorbent mixture is exposed to an aqueous acidic solution to restore mercury sorption effectiveness to the used sorbent, as described above. After the sorbent regeneration and treatment process 10, the resulting slurry is passed through an initial dewatering process 16 (e.g., via a hydroclone, vacuum filter, settling tank, heat exchanger, or other device) to remove sorbent particles from the aqueous acidic solution. The dewatering process 16 is followed by a final drying process 18 that utilizes hot process gas to bring the regenerated sorbent to a point of apparent dryness to allow subsequent handling and injection into the power system for mercury control. The majority of the aqueous solution from the dewatering process 16 is sent back to the regeneration reactor (via the path shown by arrow 20) along with a make up stream 22 comprised of water and fresh chemical reagent. A portion 24 of the aqueous solution is also sent to a system 26 that uses lime addition in a settling tank 28 and ion exchange (via ion exchanger 30) to remove sulfates prior to reuse. For some applications, the economics may favor replacing the sulfate removal step with a simple blow down stream and increased use of fresh aqueous chemical reagent (described below). In another example, as an alternative to dewatering and drying, the wet sorbent can be injected back into a flue gas stream, where it will almost instantly dry.

Figure 2:
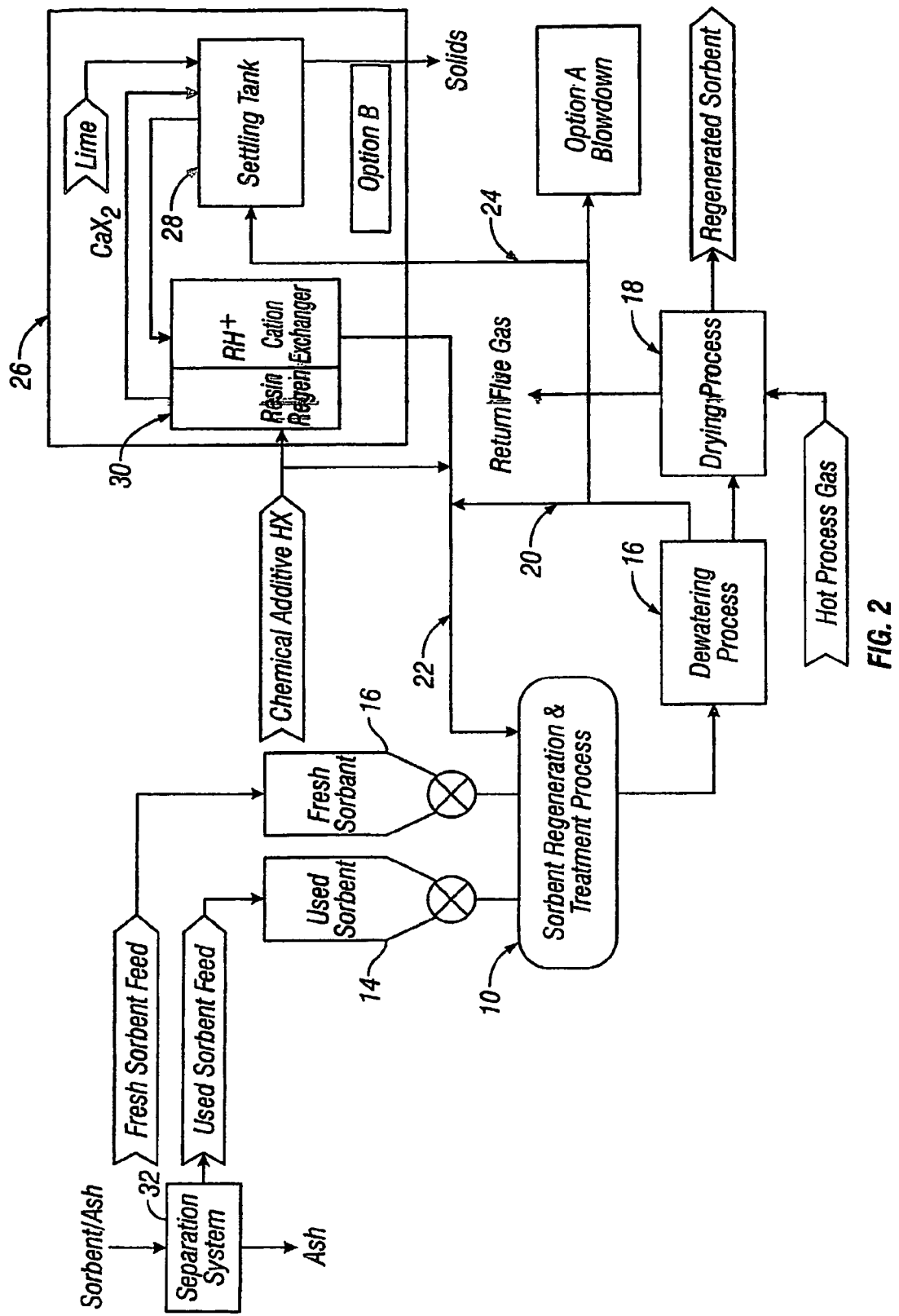
FIG. 2 is a block diagram illustrating another example of the application of the sorbent regeneration technology of the present invention.

FIG. 2 is a block diagram illustrating another example of the application of the sorbent regeneration technology of the present invention. FIG. 2 is similar to the block diagram shown in FIG. 1, with a few differences. First, FIG. 2 shows an ash separation system 32, which separates fly ash from the used sorbent.

Like the block diagram shown in FIG. 1, FIG. 2 shows storage silos 12 and 14 for providing fresh and use sorbent to a contact reactor. The contact reactor receives the mixture of fresh and used sorbent and facilitates the sorbent regeneration and treatment process 10. After the sorbent regeneration and treatment process 10, the resulting slurry is passed through a dewatering process 16 and drying process 18. Some of the aqueous solution from the dewatering process 16 is sent back to the regeneration reactor (via the path shown by arrow 20) along with a make up stream 22, as is described above. A portion 24 of the aqueous solution is also sent to a system 26 that uses lime addition in a settling tank 28 and ion exchange (via ion exchanger 30) to remove sulfates prior to reuse. As mentioned above, for some applications, the economics may favor replacing the sulfate removal step 34 with a simple blow down stream (shown as "Option A" in FIG. 2) and increased use of fresh aqueous chemical reagent.

Figure 3:
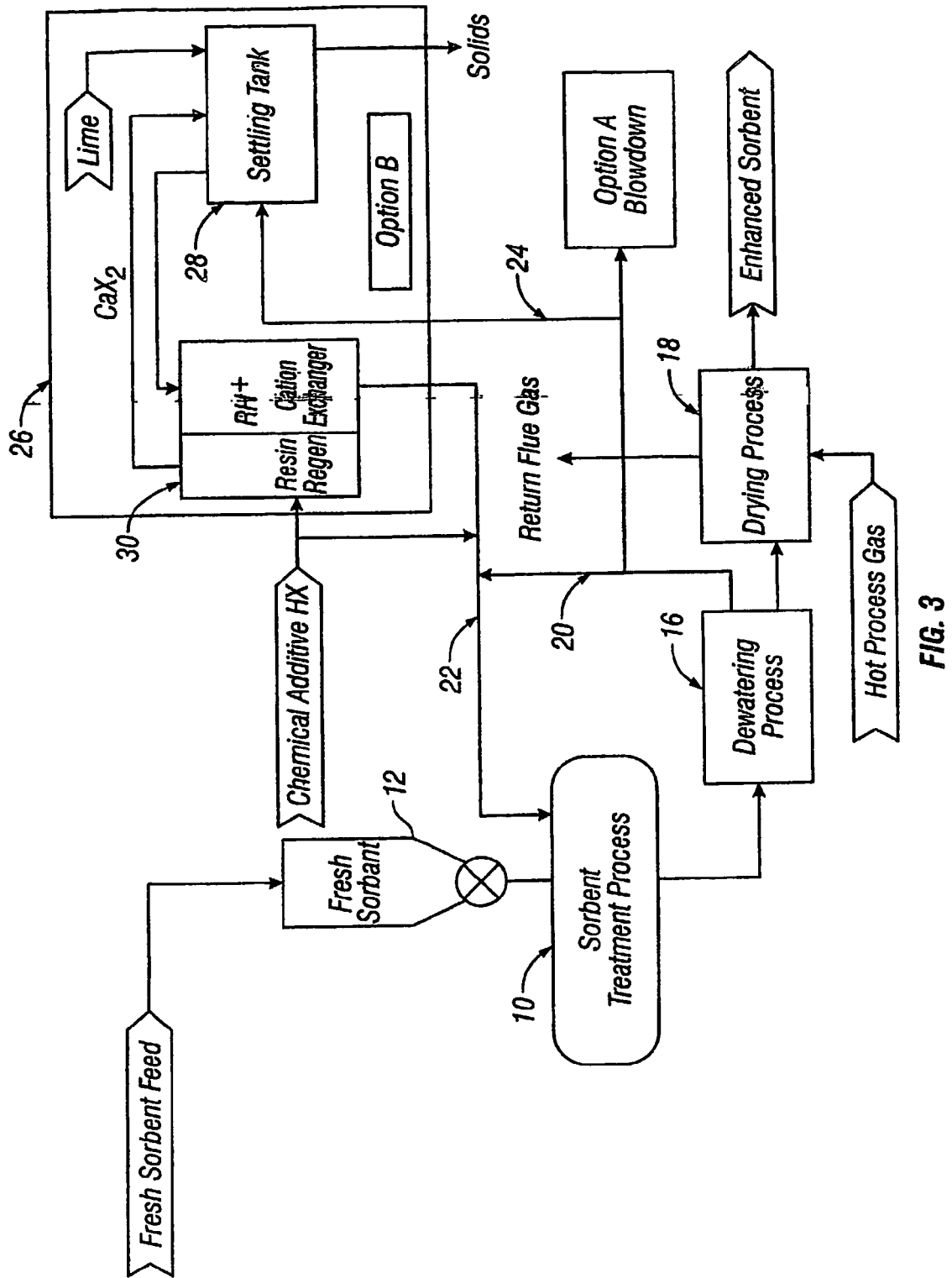
FIG. 3 is a block diagram illustrating a process for enhancing the effectiveness of a sorbent.

The present invention may also be used to enhance the effectiveness of a new sorbent. FIG. 3 is a block diagram illustrating a process for enhancing the effectiveness of a sorbent. FIG. 3 is similar to FIG. 2, without a source of used sorbent. FIG. 3 shows storage silos 12 for providing fresh sorbent to a contact reactor. The contact reactor receives the fresh sorbent and facilitates the sorbent treatment process 10, which will enhance the effectiveness of the sorbent. The remainder of FIG. 3 is the same as FIG. 2.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of regenerating a used activated carbon sorbent comprising:
    creating an activated carbon sorbent mixture containing used regenerated activated carbon sorbent and unused activated carbon sorbent;
    exposing the activated carbon sorbent mixture to a solution to remove contaminants collected on at least the used activated carbon sorbent to restore mercury sorption effectiveness to the used activated carbon sorbent, the solution including a salt containing an associated cation;
    dewatering the activated carbon sorbent mixture to remove used activated carbon sorbent and at least some contaminants from the solution forming used regenerated activated carbon sorbent and a liquid;
    drying the dewatered regenerated activated carbon sorbent from the used regenerated activated carbon sorbent mixture;
    treating at least some of the liquid to remove at least some compounds therefrom; and
    mixing at least some of the liquid with at least one of used regenerated activated carbon sorbent and unused activated carbon sorbent.

2. The method of claim 1, further comprising separating at least some ash from the used activated carbon sorbent mixture prior to exposure of the used activated carbon sorbent mixture to the solution.

3. The method of claim 1, wherein the solution is a salt solution.

4. The method of claim 1, wherein the solution includes an organic salt solution.

5. The method of claim 4, wherein the organic salt solution includes:
    at least one anion from at least one of citric acid, tartaric acid, oxalic acid, malonic acid, maleic acid, formic acid, and acetic acid; and
    at least one associated cation, such as ammonium, sodium, potassium, iron, aluminum, boron, zinc, manganese, magnesium, or calcium.

6. The method of claim 1, wherein the used activated carbon sorbent mixture contains constituents derived from a flue gas stream.

7. The method of claim 1, wherein the contaminant includes sulfuric acid.

8. The method of claim 1, wherein the mercury sorption effectiveness of the used activated carbon sorbent is restored by removing anions collected on the used activated carbon sorbent.

9. The method of claim 1, wherein the mercury sorption effectiveness of the used activated carbon sorbent is restored by removing sulfuric acid from the used activated carbon sorbent.

10. The method of claim 1, further comprising agitating the used activated carbon sorbent mixture and the solution.

11. The method of claim 1, further comprising mixing an additive with the regenerated activated carbon sorbent prior to injecting the regenerated activated carbon sorbent into the flue gas stream.

12. The method of claim 11, wherein the additive neutralizes acids.

13. The method of claim 11, wherein the additive is a calcium-based additive.

14. A method of regenerating a used activated carbon sorbent comprising:
    exposing the used activated carbon sorbent to a solution to remove contaminants collected on the used activated carbon sorbent to restore mercury sorption effectiveness to the used activated carbon sorbent;
    dewatering the used activated carbon sorbent to remove used activated carbon sorbent and contaminants from the solution forming a liquid having contaminants;
    adding a promoter comprising at least one of bromine, a bromine compound, and combinations thereof to the activated carbon sorbent;
    drying the dewatered used activated carbon sorbent forming a regenerated used activated carbon sorbent; and
    treating at least some of the liquid to remove at least some contaminants therefrom.

15. A method of regenerating a used sorbent and enhancing unused sorbent comprising:
    creating an activated carbon sorbent mixture containing used activated carbon sorbent and unused activated carbon sorbent, the activated carbon sorbent and unused carbon sorbent comprising at least one composition of granulated form and fibrous form;
    regenerating the used activated carbon sorbent by exposing the activated carbon sorbent mixture to a solution to remove contaminants collected on the used activated carbon sorbent to restore mercury sorption effectiveness to the activated carbon sorbent, the solution including a compound made up of at least one of bromine, bromine compounds, and combinations thereof for low-ash and fiber sorbent regeneration; and
    exposing the regenerated used activated carbon sorbent to a flue gas stream.

16. The method of claim 15, wherein the regenerated activated carbon sorbent is exposed to the flue gas stream by injecting the regenerated sorbent into the flue gas stream.

17. The method of claim 15, wherein the regenerated activated carbon sorbent is exposed to the flue gas stream using a fixed sorbent bed.

18. The method of claim 15, wherein the regenerated activated carbon sorbent is exposed to the flue gas stream using a traveling sorbent bed.

19. The method of claim 15, wherein the regenerated activated carbon sorbent is exposed to the flue gas stream using a traveling fiber filter.

20. A method of enhancing the effectiveness of an activated carbon sorbent for capturing mercury comprising:
    exposing the activated carbon sorbent to at least one of bromine, bromine compounds, and combinations thereof; and
    modifying the carbon edge structure of the activated carbon sorbent to form carbocations so that the activated carbon sorbent accepts electrons from neutral mercury atoms of the mercury.

21. The method of claim 20, wherein the at least one of bromine, bromine compounds, and combinations thereof promoting the modification of the structure of the activated carbon solution comprises a salt solution, the salt solution having an associated cation, such as ammonium, aluminum, boron, zinc, and iron.

22. The method of claim 20, wherein the salt solution includes an organic acid salt solution.

23. A method of enhancing the effectiveness of an activated carbon sorbent by modifying the structure of the activated carbon sorbent in a mixture of ash and activated carbon sorbent comprising:
    enhancing the activated carbon sorbent by exposing the activated carbon sorbent in a mixture of ash and activated carbon sorbent to one of an aqueous solution and a nonaqueous solution that increases sorbent effectiveness, the solution including one or more of bromine, bromine compounds, and combinations thereof, for the mixture of ash and activated carbon sorbent for the regeneration thereof; and
    exposing the regenerated enhanced activated carbon sorbent to a flue gas stream.

24. The method of claim 23, wherein the enhanced activated carbon sorbent is exposed to the flue gas stream by injecting the enhanced activated carbon sorbent into the flue gas stream.

25. The method of claim 23, wherein the enhanced activated carbon sorbent is exposed to the flue gas stream using a fixed sorbent bed.

26. The method of claim 23, wherein the enhanced activated carbon sorbent is exposed to the flue gas stream using a traveling sorbent bed.

27. The method of claim 23, wherein the enhanced activated carbon sorbent is exposed to the flue gas stream using a traveling fiber filter.

28. The method of claim 23, wherein the solution includes an inorganic acid solution.

29. The method of claim 23, wherein the solution includes an organic acid.

30. A method of removing mercury or other pollutants in a flue gas stream during the burning of fossil fuels, comprising:
    exposing an activated carbon sorbent mixture to the flue gas stream to remove at least mercury as a contaminant from the flue gas stream forming a used activated carbon sorbent;
    mixing the used activated carbon sorbent with fresh activated carbon sorbent and exposing the mixture of used activated carbon sorbent and fresh activated carbon sorbent to a solution including bromine, bromine compounds, and combinations thereof to remove contaminants collected on the used activated carbon sorbent to restore mercury sorption effectiveness to the used activated carbon sorbent and enhance sorption effectiveness of the fresh active carbon sorbent, the solution including an associated cation, such as ammonium, aluminum, boron, zinc, and iron;
    dewatering the solution to remove used activated carbon sorbent and any fresh activated carbon sorbent and contaminants from the solution;
    drying the used activated carbon and unused activated carbon sorbent particles; and
    exposing the dried used activated carbon sorbent and the fresh activated carbon sorbent to the flue gas stream to remove additional contaminants from the flue gas stream.

31. The method of claim 30, wherein the solution is a salt solution.

32. The method of claim 30, wherein the solution includes an organic salt solution.

* * * * *